United States Patent [19]

Riffle et al.

[11] Patent Number: 4,659,777

[45] Date of Patent: Apr. 21, 1987

[54] POLYSILOXANE/POLY(OXAZOLINE) COPOLYMERS

[75] Inventors: Judy S. Riffle; Iskender Yilgor, both of Oakland, Calif.

[73] Assignee: Thoratec Laboratories Corp., Berkeley, Calif.

[21] Appl. No.: 802,753

[22] Filed: Nov. 27, 1985

[51] Int. Cl.[4] .................................................. C08F 8/00
[52] U.S. Cl. .................................. 525/100; 525/54.21;
525/92; 525/104; 525/106; 525/393; 525/464;
525/474; 528/14; 528/28; 556/465
[58] Field of Search ................ 525/92, 474, 393, 464,
525/54.21, 104, 106, 100; 528/28, 14; 556/465

[56] References Cited

U.S. PATENT DOCUMENTS

| | | | |
|---|---|---|---|
| 3,620,821 | 11/1971 | Johnson | 117/126 |
| 3,679,774 | 7/1972 | Le Grand | 260/824 |
| 3,691,257 | 9/1972 | Kendrick et al. | 260/824 |
| 3,723,566 | 3/1973 | Thompson et al. | 260/824 |
| 3,821,325 | 6/1974 | Merritt, Jr. et al. | 260/824 |
| 3,935,154 | 1/1976 | Cawley | 260/33.6 |
| 4,117,027 | 9/1978 | Johnson et al. | 260/824 |
| 4,167,536 | 9/1979 | Factor | 525/450 |
| 4,269,992 | 5/1981 | Litteral et al. | 556/446 |
| 4,384,100 | 5/1983 | Takamizawa et al. | 528/41 |
| 4,436,867 | 3/1984 | Pomplun et al. | 524/503 |
| 4,496,704 | 1/1985 | Ginnings | 528/26 |
| 4,518,758 | 5/1985 | Cavezzan et al. | 528/12 |
| 4,522,985 | 6/1985 | Ryang | 525/431 |

Primary Examiner—Melvyn I. Marquis
Attorney, Agent, or Firm—Flehr, Hohbach, Test, Albritton & Herbert

[57] ABSTRACT

Novel block copolymers are provided, comprising poly(oxazoline) blocks and polysiloxane blocks. Novel polysiloxane intermediates for preparing such block copolymers are also provided which contain benzyl halide terminal groups. The block copolymers are useful as surface-modifying additives for base polymers.

14 Claims, No Drawings

POLYSILOXANE/POLY(OXAZOLINE) COPOLYMERS

The present invention is directed to novel polysiloxane-poly(oxazoline) copolymers and novel oligomer intermediates useful for the preparation thereof.

BACKGROUND OF THE INVENTION

The present invention relates to novel polysiloxane-poly(oxazoline) copolymers which are miscible with or dispersible in a variety of polymer substrates, and polar solvents. The block copolymers according to the present invention are advantageous for various applications. For example, in the field of personal care such as products for hair care, the characteristics of glossiness and smoothness are important. Since many personal care products are provided in alcohol/water solutions, it is necessary that all components for those products be either soluble or homogeneously dispersible in alcohol/water solutions. It is also desirable that when solutions are dried, the contents remain dispersed homogeneously throughout the base polymer film used in the product. While some polysiloxane oligomers and polysiloxane/polyol surfactants are known to impart glossiness and smoothness to base polymers, polysiloxanes in general and polysiloxane/polyol surfactants are not sufficiently miscible with organic base polymers to remain homogeneously dispersed when the alcohol/water solvent is volatilized.

It is also desirable that the additive in such products at least disperse in water-based emulsions. Polymers cast from emulsions sometimes contain polysiloxane additives to provide surface lubricity, however siloxanes in general and many siloxane copolymers do not disperse in water-based systems. For example, polysiloxane/polyol surfactants, which may be used in a polyurethane emulsion to form magnetic tape binders, do not remain dispersed in films after water is evaporated.

The characteristics of surface smoothness, lubricity, stain resistance, flame retardancy, antistatic surface properties, and other surface properties, are desirable in many applications whereby the surface properties are substantially provided by an additive, while the bulk properties are provided by a base polymer or substrate. As an example, in the formation of fibers which may be woven into textile materials such as carpets, outdoor recreational equipment, and the like, it would be desirable utilize additive to the fibers used in forming these textiles to enhance the lubricity for spinning of the fibers in subsequent processing. It would also be desirable to utilize an additive which would protect the surface of the fiber from staining, and to provide flame retardancy, antistatic properties, and the like.

It would also be desirable to provide an additive which imparts surface properties to a substrate such that the surface is wettable by both polar and non-polar liquids. Such an additive might allow non-polar substrates such as polyethylene and polypropylene wettable by polar liquids. Thus, for example, using such an additive, polypropylene fibers might be made water-wettable, thus providing improved breathable fabrics. Another example might be to provide polyethylene and polypropylene parts which would be paintable by water-based paints.

It is thus an object of the present invention to provide polysiloxane-poly(oxazoline) copolymers which are miscible with a variety of substrates, including polar substrates, to provide surface glossiness, smoothness and lubricity.

It is a further object of the present invention to provide polysiloxane-poly(oxazoline) copolymers which are useful as additives to synthetic fibers to impart surface stain resistance, antistatic properties, and/or flame retardancy.

It is a further object of the present invention to provide polysiloxane-poly(oxazoline) block copolymers which are useful as additives to a variety of substrates to impart surface wettability by both polar and nonpolar liquids.

It is yet another object of the present invention to provide novel polysiloxane oligomers which are useful as intermediates for preparing polysiloxane-containing copolymers.

Additional objects, advantages and novel features of the present invention will be set forth in part in the following description and in part will become apparent to those skilled in the art upon examination of the following, or may be learned by practice of the invention. The objects and advantages of the invention may be realized and obtained by means of the instrumentalities and combinations particularly pointed out in the appended claims.

SUMMARY OF THE INVENTION

The present invention provides novel polysiloxane-poly(oxazoline) block copolymers comprising blocks of the formula $$\left[ \begin{array}{c} O=CR' \\ | \\ -NCH_2CH_2- \end{array} \right]_m$$

and blocks of the formula $$\left[ \begin{array}{c} R \\ | \\ -Si-O- \\ | \\ R \end{array} \right]_n$$

wherein R is alkyl of 1 to 4 carbon atoms, fluoroalkyl of 1 to 4 carbon atoms or aryl of 5 to 10 carbon atoms; R' is hydrogen, alkyl of 1–4 carbon atoms or aryl of 5 to 10 carbon atoms, and n and m are independently 1 to about 200. A preferred class of block copolymers includes those of the formula A-B-A
wherein A is

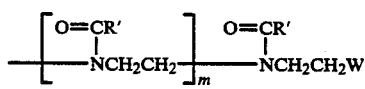

wherein B is

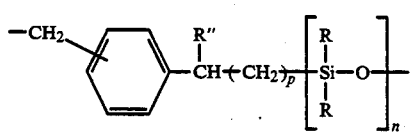

-continued

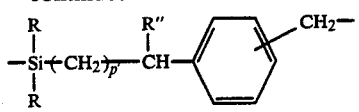

wherein R is alkyl of 1 to 4 carbon atoms, fluoroalkyl of 1 to 4 carbon atoms or aryl of 5 to 10 carbon atoms; n is an integer from 1 to about 200; m is an integer from 1 to about 200; R' is hydrogen, alkyl of 1 to 4 carbon atoms, or aryl of 5 to 10 carbon atoms; R" is hydrogen or methyl; p and p' are independently 0 or 1; and W is halo, aryl of 5 to 10 carbon atoms or alkyl of 1 to 10 carbon atoms. The invention further provides novel polysiloxane polymers of the formula

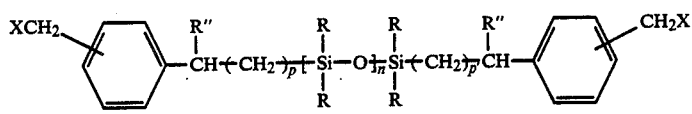

wherein R, R", n, p, p' are as defined above and X is halo, aryl of 5 to 10 carbon atoms, or fluoroalkyl of 1 to 4 carbon atoms.

The polysiloxane polymers are useful as oligomer intermediates for preparation of the polysiloxane-poly(oxazoline) block copolymers or other copolymers.

DESCRIPTION OF THE INVENTION

The copolymers provided in accordance with the present invention are of the class known as "block" copolymers. Block copolymers are composed of at least two blocks, one block composed of one type of recurring unit (e.g., siloxane units as in the copolymers useful in the present invention) and at least one other block composed of a different type of recurring unit (e.g., oxazoline units as in the copolymers useful in the present invention). Block copolymers as defined herein may be linear, cyclic or branched (cross-linked) structures. The preferred block copolymers provided in accordance with the present invention are linear.

The polysiloxane polymers which are useful as intermediates in providing the block copolymers according to the present invention will sometimes be referred to as "oligomers." As used herein, the term "oligomer" will refer to a polymer, which may be a block copolymer as well, containing at least two and up to about 200 recurring monomer units.

The preferred novel block copolymers according to the present invention are of the formula A-B-A as defined hereinabove. The group R may be an alkyl group of one to four carbon atoms, fluoroalkyl of 1 to 4 carbon atoms, including linear or branched groups, aryl of 5 to 10 carbon atoms, or combinations thereof. The preferred group is methyl. Aryl groups include, but are not limited to, phenyl, naphthyl, or benzyl. The length of the polysiloxane blocks, as determined by the integer n, is preferably in the range of 5 to 150. The length of the polyoxazoline blocks, as determined by the integer m, is preferably in the range of 5 to 200. The length of the respective blocks (i.e., the values of m and n) may be controlled by the amounts of reactants used, described hereinbelow. The group R' may be hydrogen, linear or branched alkyl of 1 to 4 carbon atoms or aryl of 5 to 10 carbon atoms, including phenyl, naphthyl, benzyl. Preferably, R' is hydrogen or alkyl, with ethyl being the most preferred.

The group W is preferably chloro. Upon polymerization of the oxazoline, initially W will be halo, preferably chloro, but these terminal halo groups may be substituted by conventional reactions to aryl and/or alkyl groups or to any other substituent formable by reaction with a halo group.

The group R" is preferably methyl when p (or corresponding p') is zero and R" is preferably hydrogen when p (or corresponding p') is 1. The two R" groups may be the same or different from one another.

The polysiloxane polymers useful as intermediates having a formula as described hereinabove are preferably those wherein R, R", p, p', and n are the preferred groups having integers defined above in connection with the preferred block copolymers. The group X is preferably chloro. The chloro group may be substituted by conventional reactions to aryl and/or alkyl groups, or to any other substituent formable by reaction with a chloro group.

The polysiloxane polymer intermediates according to the present invention may be prepared by the following steps. Dialkylchlorosilane may be reacted with vinylbenzyl chloride to produce a hydrosilated addition product. Hydrolysis of this addition product forms a benzyl chloride-terminated disiloxane. Reaction of the disiloxane with cyclic siloxanes and a catalytic amount of a strong acid, such as trifluoromethanesulfonic acid, forms the polysiloxane oligomeric intermediates according to the present invention (wherein X is chloro). The molecular weight of the polysiloxane polymers may be controlled by the amounts of the respective reactants utilized. The benzyl halide terminal groups of these polysiloxane intermediates serve as the initiator species, in the presence of a catalytic amount of sodium iodide for initiation of the polymerization of the oxazoline monomer.

To form the polysiloxane-poly(oxazoline) block copolymers according to the present invention, the polysiloxane polymer intermediates are reacted in bulk or in a solvent with, for example, 2-ethyloxazoline to form polysiloxanepoly(oxazoline) block copolymers of the formula A-B-A described hereinabove, wherein R' is ethyl. These block copolymers are physically characterized as glassy, tack-free, film-forming, transparent polymers at room temperature. The block copolymers are soluble in polar solvents such as a mixture of 20% by volume methanol/80% water.

The block copolymers according to the present invention are characterized by both polar blocks (poly(oxazoline)) and nonpolar blocks (polysiloxane). They are compatible and miscible with a wide variety of substrates. As used herein, the term compatibility means the ability of the copolymer additive to remain homogeneously dispersed within the base polymer at a concentration of about 2% or more weight of the additive. These substrates include polymers such as polyacrylonitrile, polyvinylchloride, polyvinylacetate, polyvinylidene chloride, poly(methylmethacrylate), polystyrene, polyphenylene oxide, poly(ethylacrylate), polyacrylic acid, polypropylene, polyethylene, polyethylenepropylene copolymers, polyethylene-vinyl acetate copolymers, polyurethanes and cellulose derivatives, and mixtures thereof.

To modify the surface properties of such substrates, relatively small amounts of the block copolymers according to the present invention need to be utilized. Preferably, about 1 to 5 parts by weight of the block copolymer according to the present invention is used as an additive with 99 to 95 parts by weight of the substrate (also called the base polymer).

A method by which the block copolymers according to the present invention may be mixed with the base polymer include, but are not limited to, melt blending, extrusion blending, blending in solution, particularly when the base polymer is soluble in polar solvents, and by other methods known to those skilled in the art of forming polymer blends.

While not intending to be bound by a particular theory, it is believed that when the block copolymers according to the present invention are blended with other polymeric materials, the non-polar polysiloxane component causes the block copolymer to migrate to the surface of the material. It is thus believed that this results in an interface with air dominated by polysiloxane, causing the contact angles of nonpolar solvents on the surfaces to be relatively low. By contact angle is meant the angle which is measured according to the conventional test between the edge of the drop of a liquid and the surface of the solid material in contact therewith. However, since the polar poly(oxazoline) block is also relatively close to the surface of the material because it is chemically linked to the polysiloxane, when the surface of the film is wetted with a polar liquid (such as water or diethylene glycol) it is believed that the polar poly(oxazoline) block rises to the surface of the material to produce a polar surface. Consequently, the contact angle of polar liquids on these surfaces is also relatively low. Thus, the block copolymer additives according to the present invention offer the advantages of producing film surfaces which are wetted by both polar and non-polar liquids. An example of a use for products having such properties would be a non-polar substrate (such as polyethylene) paintable by water-based paints.

The block copolymer additives according to the present invention are also advantageous, for example, as an additive in synthetic fibers which are used to form textiles, carpets, outdoor equipment, and the like. Thus, for example, if the block copolymer additives are added to synthetic polymers to be formed into fibers just prior to the stage at which the fibers are spun, the lubricity required for the spinning and processing of the fibers is enhanced. Also, since the siloxane block is immiscible with many organic materials, the surface of the subsequently formed fiber will be protected from staining from organic materials. Also, being wettable by water, materials made from such fibers would be breathable. Furthermore, when burned, polysiloxanes form a char which is believed may act as a protective flame retardant surface for the fiber. The poly(oxazoline) block of the copolymer may also impart antistatic properties to the fibers, useful, for example, in the formation of carpets.

The block copolymers according to the present invention are also useful in personal care products since they are miscible with polar base polymers used in these types of products and soluble in alcohol/water solutions. Thus, upon volatilization of these solvents, the block copolymers according to the present invention remain homogeneously dispersed within the base polymer film to retain uniform glossiness and smoothness of the product.

In addition to the properties described above, the block copolymers according to the present invention are also useful as film-forming surfactants, polishes, biomaterials, adhesives, mold and adhesive release agents, lubricating agents and as additives wherein changes in surface properties may be desired.

The following examples are presented to help in the better understanding of the present invention and for purposes of illustration. The example, however, are not to be construed as limiting the invention to the precise form disclosed or to limit the scope of the invention in any manner or means.

EXAMPLE 1

PREPARATION OF Cl-Si(R)$_2$CH$_2\phi$CH$_2$Cl

A chloroplatinic acid catalyst solution is prepared by charging a vial with 0.338 g of hydrogen hexachloroplatinate hydrate and dissolving it in 1 ml dry n-propanol and 5 ml dry diglyme.

A 500 ml round bottomed flask is charged with 146.5 g freshly distilled vinylbenzyl chloride and 250 $\mu$l of the above-described catalyst solution. The reaction mixture is stirred under nitrogen for 1 hour at 30°±1° C. The solution turns a deep orange color during this stage. Subsequently, 90.6 g distilled dimethylchlorosilane is added in four additions in approximately the following amounts: 24 g, 24 g, 24 g, 18.6 g. Following each addition, the 30° C. temperature is maintained until the disappearance of the Si-H absorbance in the infrared spectrum ($\sim$2132 cm$^{-1}$). At a pot temperature of 110°-112° C., the product is vacuum distilled at about 0.1 mm pressure (b.p. 94° C./0.1 mm).

EXAMPLE 2

To 1.18 g sodium carbonate dissolved in 20 ml distilled water is added 20 g toluene and 5 g of the product of Example 1. The mixture is interfacially reacted under nitrogen at 65° C. for $\frac{1}{2}$ hour. The phases are separated and the toluene/water azeotrope is distilled from the product phase at a pot temperature of 100°-125° C. over a period of $\sim$1$\frac{1}{2}$ hours. Residual toluene is vacuum stripped from the product at $\sim$60° C. The product is the benzyl chloride functional disiloxane to be used as the endblocker in the redistribution reaction of the benzyl chloride terminated polydimethylsiloxane oligomers.

EXAMPLE 3

To form oligomer of about 2500 molecular weight, a flask is charged with 18.65 g of the benzyl chloride-terminated disiloxane (the product of Example 2), and 87.84 g octamethylcyclotetrasiloxane (D$_4$) and heated to 60° C. Forty-six $\mu$l trifluoromethanesulfonic acid is added and the reaction temperature is maintained under nitrogen with agitation for 30 hours. The mixture is washed three times with water and extracted with diethyl ether to remove residual catalyst. The diethyl ether is evaporated under vacuum and residual D$_4$, D$_5$ and higher cyclics is vacuum distilled at approximately 110° C./20$\mu$. The amount of cyclics remaining in the equilibrate at the end of the reaction is about 5–10% of the total reaction mixture. A clear oligomer results, having a unimodal, approximately gaussian molecular weight distribution and a number average molecular weight of approximately 2300 g/mole.

EXAMPLE 4

Preparation of a Polysiloxane/Poly(2-ethyl)oxazoline Block Copolymer

A resin kettle equipped with a nitrogen inlet and an agitator suitable for high viscosity polymers is charged with 85.6 g of the polysiloxane oligomer from Example 3, 179.8 g distilled 2-ethyloxazoline, and 0.255 g sodium iodide. The mixture is reacted at 130° C. for 17 hours. A viscous, clear, yellow block copolymer results.

EXAMPLE 5

Films of polyvinylchloride with and without various amounts of the surface-modifying block copolymer additives were solution cast and the water contact angle was measured after being present on the films for 1 minute and 3 minutes. The data is presented in Table 1.

TABLE 1

| Sample | Contact Angle ($H_2O$) | |
|---|---|---|
| | 1 min. | 3 min. |
| Polyvinylchloride | 83° | 77° |
| Polyvinylchloride + 3% of a polycaprolactone block copolymer | 95° | 93° |
| Polyvinylchloride + 3% of a polysiloxane/poly(2-ethyl)oxazoline block copolymer | 20° | 15° |
| Polyvinylchloride + 3% poly(2-ethyl)oxazoline | 64° | 60° |

For the same set of samples advancing water contact angles were measured 1 minute after being placed on the film, then receding contact angles were measured 1½ minutes after being placed on the film. The data is shown in Table 2.

TABLE 2

| Sample | Advancing Angle (1 min.) | Receding Angle (1½ min.) |
|---|---|---|
| Polyvinylchloride | 85° | 83° |
| Polyvinylchloride + 3% polysiloxane/polycaprolactone block copolymer | 97° | 93° |
| Polyvinylchloride + 3% polysiloxane/poly(ethyl) oxazoline block copolymer | 17° | ≈7° |
| Polyvinylchloride + 3% polyethyloxazoline | 65° | 44° |

By comparison, the contact angles of nonpolar liquids on the polymers in Table 2 remain low. These data show that the polyvinylchloride with the polysiloxane-polyoxazoline block copolymer additive possesses a surface rapidly wettable by both polar and non-polar liquids.

The foregoing description of the preferred embodiments of the present invention is presented for the purposes of illustration and description. It is not intended to be exhaustive or to limit the invention to the precise examples disclosed and obviously many modifications and variations are possible in light of the above teachings. The particular embodiments described above were selected and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

We claim:

1. A block copolymer comprising blocks of the formula

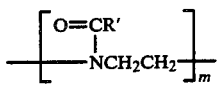

and blocks of the formula

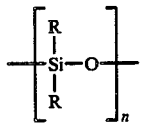

wherein R is alkyl of 1 to 4 carbon atoms, fluoroalkyl of 1 to 4 carbon atoms or aryl of 5 to 10 carbon atoms; R' is hydrogen, alkyl of 1 to 4 carbon atoms or aryl of 5 to 10 carbon atoms; and n and m are independently 1 to about 200.

2. A block copolymer according to claim 1 wherein said blocks are contained in a compound of the formula A-B-A
wherein A is

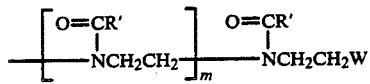

B is

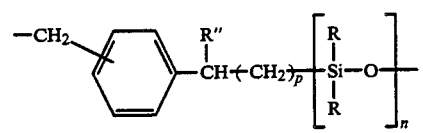

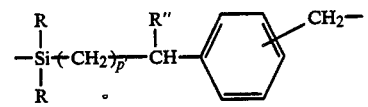

R" is hydrogen or methyl; p and p' are independently 0 or 1; and W is halo, aryl of 5 to 10 carbon atoms or alkyl of 1 to 10 carbon atoms.

3. A block copolymer according to claim 2 wherein R is methyl.

4. A block copoylmer according to claim 3 wherein n is an integer from 5 to 150 and m is an integer from 5 to 200.

5. A block copolymer according to claim 3 wherein R' is ethyl and W is chloro.

6. A polymer of the formula

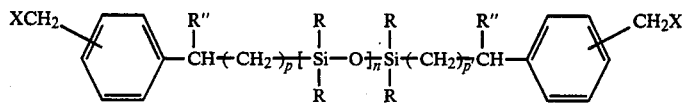

wherein X is halo, aryl of 5 to 10 carbon or fluoroalkyl of 1 to 4 carbon atoms; R is alkyl of 1 to 4 carbon atoms, fluoroalkyl of 1 to 4 carbon atoms or aryl of 5 to 10 carbon atoms; R" is hydrogen or methyl; n is an integer from 1 to about 200 and p and p' are independently 0 or 1.

7. A polymer according to claim 6 wherein R is methyl.

8. A polymer according to claim 6 wherein X is chloro.

9. A polymer according to claim 6 wherein n is from 5 to 150.

10. A polymer mixture comprising a base polymer and from 1 to 5 parts by weight of a block copolymer of the formula A-B-A wherein A is

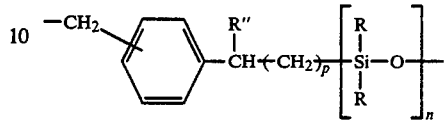

B is

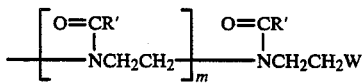

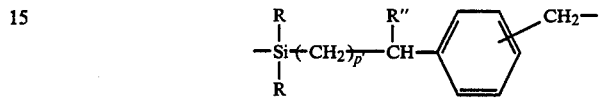

R" is hydrogen or methyl; p and p' are independently 0 or 1; and W is halo, aryl of 5 to 10 carbon atoms or alkyl of 1 to 10 carbon atoms; R is alkyl of 1 to 4 carbon atoms, fluoroalkyl of 1 to 4 carbon atoms or aryl of 5 to 10 carbon atoms; R' is hydrogen, alkyl of 1 to 4 carbon atoms or aryl of 5 to 10 carbon atoms; and n and m are independently 1 to about 200.

11. A polymer mixture according to claim 10 wherein said base polymer is selected from the group consisting of polyacrylonitrile, polyvinylchloride, polyvinylacetate, polyvinylidene chloride, poly(methylmethacrylate), polystyrene, polyphenylene oxide, poly(ethylacrylate), polyacrylic acid, polycarbonate, polypropylene, polyethylene, polyethylenepropylene copolymers, polyethylene-vinyl acetate copolymers, polyurethane and cellulose derivatives, and mixtures thereof.

12. A mixture according to claim 11 wherein R is methyl.

13. A mixture according to claim 12 wherein n is from 5 to 150 and m is from 5 to 200.

14. A mixture according to claim 13 wherein R' is ethyl and W is chloro.

* * * * *